United States Patent [19]
McGhee

[11] Patent Number: 5,984,487
[45] Date of Patent: Nov. 16, 1999

[54] BICYCLE VISIBILITY ENHANCEMENT DEVICE

[76] Inventor: Dwight A. McGhee, 3032 Penny La., Modesto, Calif. 95354

[21] Appl. No.: 08/856,492

[22] Filed: May 14, 1997

[51] Int. Cl.⁶ .................................................. B62J 6/00
[52] U.S. Cl. .................... 362/72; 280/288.4; 340/432; 362/32; 362/72; 362/78; 362/186; 362/35; 362/190; 362/191
[58] Field of Search ..................... 280/288.4; 340/432; 362/32, 72, 78, 186, 35, 190, 191

[56] References Cited

U.S. PATENT DOCUMENTS

| | | | |
|---|---|---|---|
| D. 317,055 | 5/1991 | Moore | D26/35 |
| 2,811,633 | 10/1957 | Bjork | 362/72 |
| 3,987,409 | 10/1976 | Freeman | 340/432 |
| 4,135,229 | 1/1979 | Modurkay | 362/72 |
| 4,176,390 | 11/1979 | Galbert | 362/72 |
| 4,225,848 | 9/1980 | Roberts | 340/432 |
| 4,381,537 | 4/1983 | Hinrichs | 362/78 |
| 4,562,516 | 12/1985 | Chastain | 362/78 |
| 4,763,230 | 8/1988 | Cummings et al. | 362/78 |
| 4,787,014 | 11/1988 | Wodder et al. | 362/78 |
| 4,819,135 | 4/1989 | Padilla et al. | 362/72 |
| 4,847,735 | 7/1989 | Kawasaki | 362/72 |
| 5,121,305 | 6/1992 | Deed et al. | 362/72 |
| 5,148,697 | 9/1992 | Shiraishi et al. | 72/405 |
| 5,278,732 | 1/1994 | Frankum | 362/72 |
| 5,283,547 | 2/1994 | Leon | 340/432 |
| 5,333,101 | 7/1994 | McEvoy | 362/72 |
| 5,418,697 | 5/1995 | Chiou | 362/72 |
| 5,477,427 | 12/1995 | Forman | 362/72 |

*Primary Examiner*—Alan Cariaso
*Attorney, Agent, or Firm*—Heisler & Associates

[57] ABSTRACT

A bicycle visibility enhancement device 10 is provided which is powered by electricity from an on board battery 39 and is securely attached to one or more of the wheels 2 of a bicycle. The bicycle visibility enhancement device 10 includes a left housing 20 and right housing 50 which are both semi-circular and can be secured together through bolts 70, 71 sandwiching the axle 7 of the bicycle wheel 2 there between, adjacent troughs 26, 56. Battery bores 36, 37, 66, 67 are provided within the housings 20, 50 to support the batteries 39 which provide electricity to the bicycle visibility enhancement device 10. At least two light assemblies 40 are provided, one extending from each housing 20, 50 and oriented to direct light away from the housings 20, 50. Wiring 33, 63 couples the batteries 39 to the light assemblies 40. Each light assembly 40 has a light refraction tube 90 extending therefrom from the housing 20, 50 out to the rim 4 of the bicycle wheel 2. The light refraction tube 90 is conical and formed of translucent material such that light emanating from the light assembly 40 is refracted through a conical surface 96 of the light refraction tube 90 and the entire light refraction tube 90 is illuminated. Hence, the wheels 2 of the bicycle, especially when rotating, are provided with significant visibility enhancement.

20 Claims, 3 Drawing Sheets

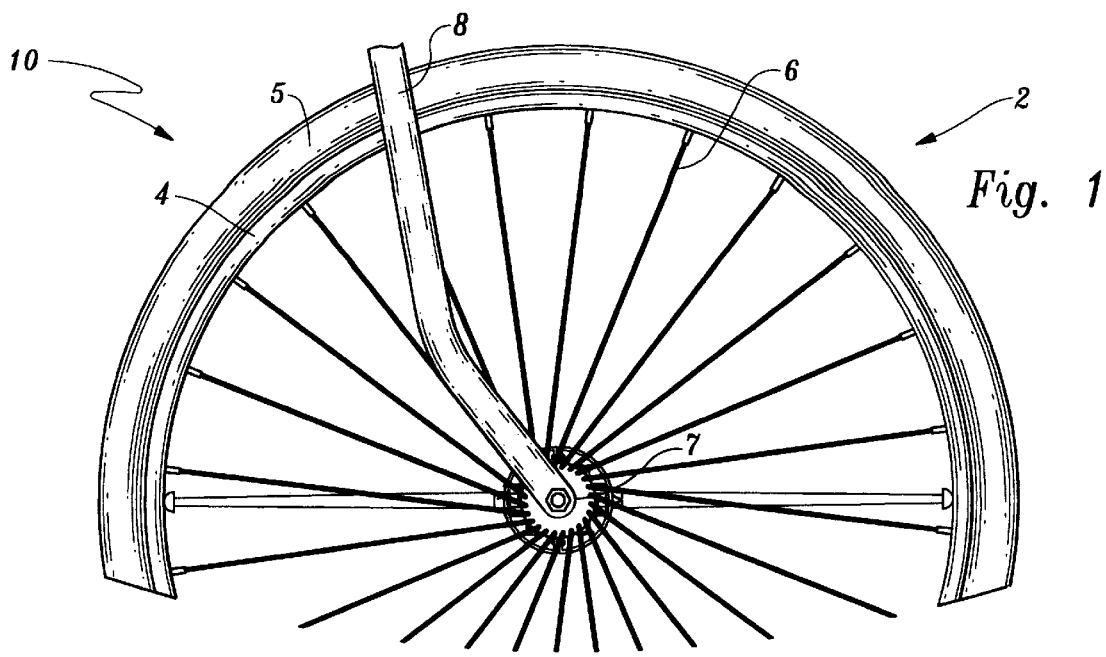
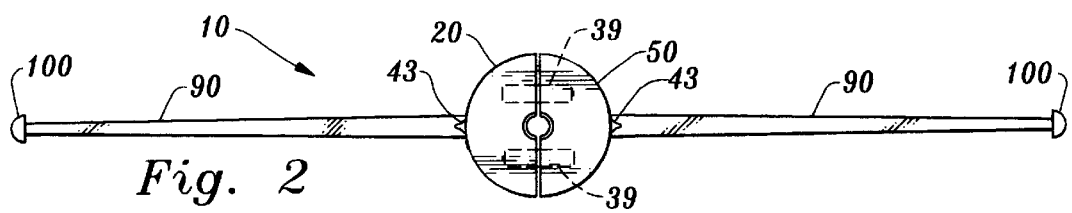
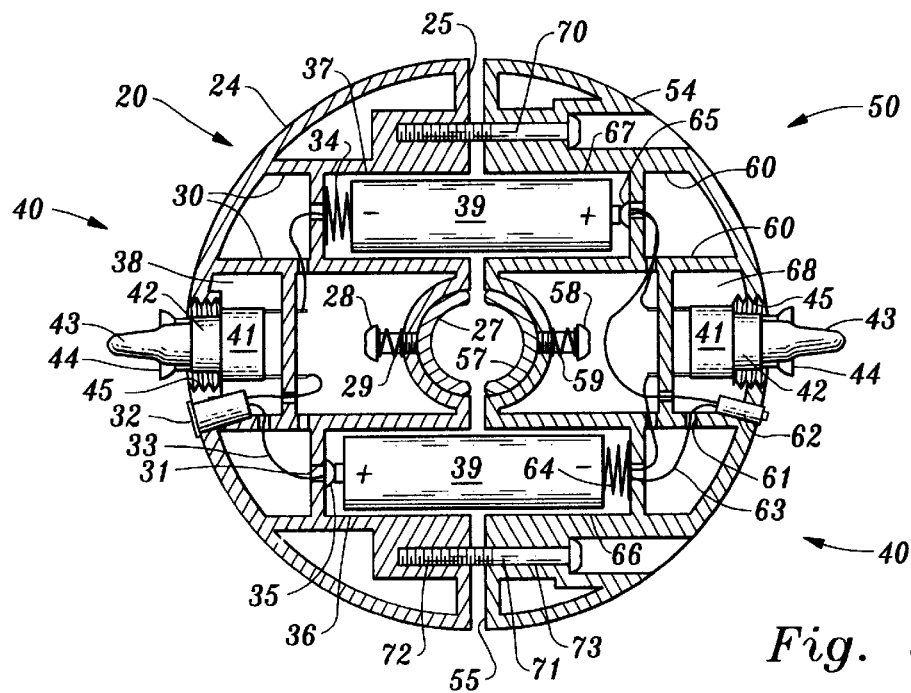

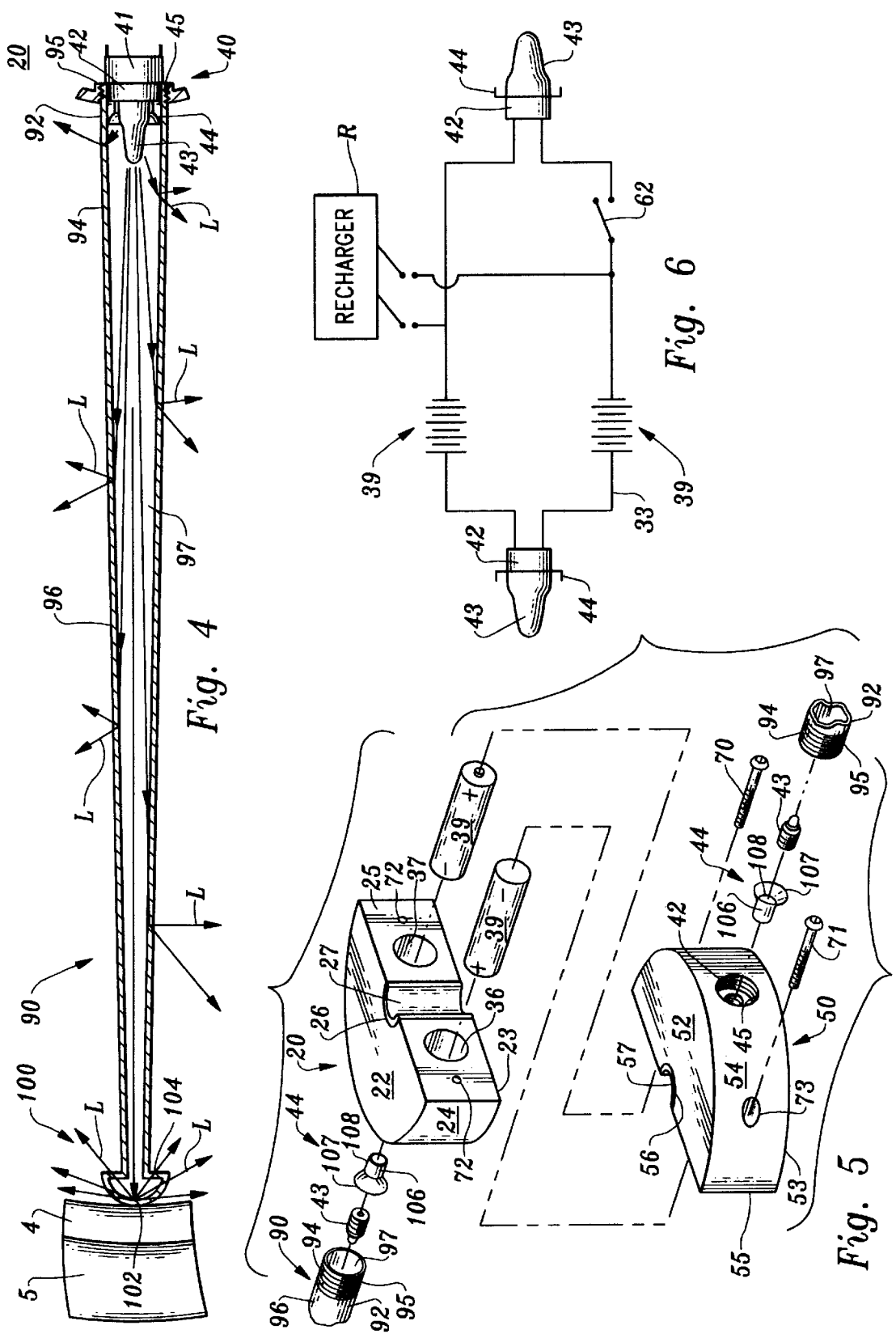

BICYCLE VISIBILITY ENHANCEMENT DEVICE

FIELD OF THE INVENTION

This invention relates to visibility enhancement systems which are attachable to wheels of a bicycle or other wheeled vehicle to enhance their visibility in limited lighting conditions. More particularly, this invention relates to wheeled vehicle visibility enhancement devices which are battery powered and which provide continuous light radiating therefrom in a pattern which rotates along with the wheels to which the visibility enhancement device is attached.

BACKGROUND OF THE INVENTION

Illumination devices have long been known in the art to enhance the visibility of bicycles or other wheeled vehicles in limited lighting conditions. For instance, reflectors are commonly mounted to bicycle frames and to the spokes of bicycle wheels which cause the headlights of motor vehicles to reflect therefrom and enhance the visibility of the bicycle. In fact, reflectors and other visibility enhancement devices are required by many states and local governments for bicycles to be operated after dusk. Reflectors suffer from the draw back that they do not provide any visibility enhancement unless another light, such as a headlight, is shining upon the reflectors on the bicycle. Headlights and other lighting devices are known which point in a direction in which the cyclist is traveling, some of which are powered by an on board electrical power supply and others of which are powered by the human rider through the pedal action of the bicycle. However, these devices only provide visibility enhancement when the bicycle is viewed from the front. Most bicycle accidents occur when vehicles strike the bicycle from the side.

A third class of bicycle visibility enhancement devices are lights which are actually illuminated, either by an electrical power supply or from the human's power generated from the pedals, and which either flash or provide some sort of continuous light. While these devices are generally superior to reflectors and headlights, these devices suffer from numerous drawbacks. The illumination systems either provide an unacceptably low level of visibility enhancement or they require too much power such that either performance of the bicycle is significantly degraded or inconveniently large electrical power supplies, such as batteries, are required to power the system for a reasonable length of time. Also, the weight distribution of these devices is not symmetrical upon the wheels, further degrading the performance of the bicycles mounted with such prior art visibility enhancement systems.

Accordingly, a need exists for a bicycle visibility enhancement device which can attach securely to wheels of the bicycle without significantly altering a balance and rotational inertia of the bicycle wheels, and which requires a low level of electrical power; and yet provides a high level of illumination to enhance the safety with which the bicycle can be operated.

SUMMARY OF THE INVENTION

The bicycle visibility enhancement device is an electrically powered illuminated structure which rigidly attaches to one or both of the wheels of a bicycle or other wheeled vehicle. The invention includes a left semi-circular housing and a right semi-circular housing which connect together with the axle of the wheel oriented there between. The two housings together support a source of electric power such as batteries and at least two light sources which are coupled to the batteries so that power from the batteries causes the lights to be illuminated when desired. The housings also include an on/off switch and a port for connection of the device to a recharger capable of recharging the batteries. Appropriate wiring interconnects the batteries to the light sources within the housings.

A light refraction tube is oriented over each of the light sources. Each light refraction tube extends from a location adjacent the housing and overlying one of the light sources to a point extending out toward the rim of the bicycle wheel. The light refraction tube is made of a translucent material which reflects some of the light impacting an interior surface thereof and transmits other portions of the light through the wall of the light refraction tube, causing an outer surface of the light refraction tube to emit rays of light all along the length of the light refraction tube. With two light sources and two light refraction tubes on each wheel of a standard bicycle with 26 inch wheels, a total of 52 inches of length of the bicycle is provided with enhanced visibility.

The light refraction tubes are securely attached to the housing and extend within a plane between spokes of the wheel of the bicycle. The housing and light refraction tubes all rotate along with rotation of the wheel, to create a visually highly noticeable appearance. The light sources and light refraction tubes overlying the light sources are spaced equally from each other about a periphery of the housings, such that the device is radially symmetrical and weight of the device added to the wheel is evenly distributed, to prevent adverse effects on the performance of the wheel to which the device is attached. The two housings are preferably similar to each other so that a single mold can form both the left housing and the right housing and only be slightly modified in different manners to accommodate the unique features of each half.

The light sources preferably are sufficiently low power that they can operate off of a three volt electric current such as that which would be provided by as few as two 1.5 volt "AA" batteries connected in series. The light sources are continuous, rather than blinking. Each battery is either oriented partly in each housing or exclusively in one housing in a manner such that the electrical circuit including the batteries is partly located in the left housing and partly located in the right housing. When power within the batteries is exhausted, the device can be coupled to a recharger to recharge the batteries, without removal of the device from the wheel of the bicycle.

OBJECTS OF THE INVENTION

Accordingly, it is a primary object of the present invention to provide a bicycle visibility enhancement device which can securely attach to one or both of the wheels of a bicycle and provide illumination to the bicycle in a manner which significantly enhances the visibility of the bicycle, especially in low light conditions, for maximum illumination coverage of the bicycle.

Another object of the present invention is to decrease the possibility that a bicycle would be struck by another vehicle, by enhancing the visibility of the bicycle, especially when viewed from the side.

Another object of the present invention is to enhance visibility of the bicycle by providing illumination across a full diameter of each wheel.

Another object of the present invention is to provide a bicycle visibility enhancement device which can optionally run off of battery power, or an electric generator, magnet, or solar electric power and which does not alter the performance of the bicycle significantly.

Another object of the present invention is to provide a bicycle visibility enhancement device which securely attaches to wheels of the bicycle in a manner which does not affect the rotation of the wheels of the bicycle and is totally located within and protected by spokes of the wheel, for best protection of the device.

Another object of the present invention is to provide a bicycle visibility enhancement device which maximizes the illumination which is obtained from a low power light source and fully illuminates the wheels of the bicycle in low visibility conditions, such as at night.

Another object of the present invention is to provide a bicycle visibility enhancement device which is battery powered and rechargeable without removal of the device from the bicycle.

Another object of the present invention is to provide a signal lamp assembly which enhances the visibility of a bicycle and which runs off of batteries and can either be switched on and off when desired or switch on when the wheel rotates and off when the wheel stops.

Another object of the present invention is to provide a visibility enhancement device for use in combination with a bicycle wheel, hub, rim and spokes which will connect to the hub of the bicycle wheel.

Another object of the present invention is to provide a bicycle visibility enhancement device which can be seen on a bicycle regardless of the angle with which the bicycle is viewed.

Another further object of the present invention is to provide a visibility enhancement device which can be simply formed from readily availably low cost materials.

Other further objects of this invention will become apparent upon a careful reading of the included description of the preferred embodiments and review of the drawings included herein.

BRIEF DESCRIPTION OF THE DRAWING FIGURES

FIG. 1 is a front elevation view of a portion of a bicycle wheel with the bicycle visibility enhancement device of this invention oriented thereon.

FIG. 2 is a front elevation view of this invention shown removed from the bicycle wheel.

FIG. 3 is a full sectional view of the two housing portions of this invention coupled together, and revealing the interior details of the housing portion of this invention.

FIG. 4 is a front elevation view of a light reflection tube portion of this invention with portions thereof cut away to reveal interior details.

FIG. 5 is an exploded parts view of the two housings of this invention and portions of the light reflection tubes of this invention, revealing how the separate parts of this invention are coupled together.

FIG. 6 is a schematic view of an electric circuit which is utilized to provide electric power to light sources of this invention.

DETAILED DESCRIPTION OF THE PREFERRED EMBODIMENT

Figure 7:
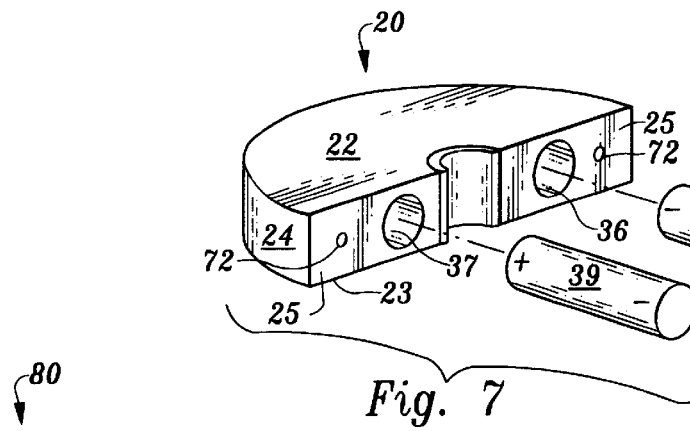
FIG. 7 is a perspective view of a left housing of this invention revealing how the batteries are oriented within the left housing.

Referring to the drawings, reference numeral 10 is directed to a bicycle visibility enhancement device. The bicycle visibility enhancement device 10 is securely coupled to a wheel 2 of a bicycle or other wheeled device such as a wheel chair, baby carrier or motorcycle, and extends out to a rim 4 of the bicycle wheel 2 while being securely connected to the axle 7 of the bicycle wheel 2.

In essence, and with reference to FIGS. 2 and 3, the bicycle visibility enhancement device 10 includes a left housing 20 and a right housing 50 which are coupled together about the hub 7 (FIG. 1) of a wheel 2 of a bicycle. Both the left housing 20 and the right housing 50 support a light assembly 40 thereon which includes a light bulb 43 for providing light within the visible spectrum. A light refraction tube 90 overlies each light assembly 40 and extends perpendicularly away from the housings 20, 50. The light refraction tube 90 extends out to a tip 100 adjacent the rim 4 of the wheel 2 of the bicycle. The light refraction tube 90 redirects light rays L (FIG. 4) which impact an interior of the wall 94 of the light refraction tube 90, causing the light refraction tube 90 to be illuminated and to provide enhanced visibility to the bicycle.

More specifically, and with particular reference to FIG. 3, details of the left housing 20 are provided. The left housing 20 is a substantially hollow rigid construct which is generally semi-circular and of constant thickness. The left housing 20 includes a planar top surface 22 (FIG. 5) parallel to and spaced from a planar bottom surface 23. A curved side 24 is oriented perpendicular to the top surface 22 and bottom surface 23 and extends along a perimeter of the left housing 20, defining the curved semi-circular side of the left housing 20. A flat side 25 is oriented perpendicular to the top surface 22 and the bottom surface 23 and extending there between and is generally opposite the curved side 24 of the left housing 20.

A semi-cylindrical trough 26 (FIG. 5) is oriented within the flat side 25 at a location which is a constant distance to various different points along the curved side 24. The trough 26 has a diameter similar to a diameter of the axle 7 of the bicycle wheel 2 to which the left housing 20 is to be attached.

A tightening plate 27 is oriented within the trough 26 and is also semi-cylindrical, and has a constant thin thickness. A set screw 28 is threaded through a wall of the trough 26 such that it abuts the tightening plate 27. A spring 29 is oriented between the set screw 28 and the trough 26, to support the set screw 28 in position perpendicular with respect to the wall of the trough 26. When the set screw 28 is tightened, it is caused to extend slightly into the trough 26 and cause the tightening plate 27 to be displaced slightly away from the trough 26. The set screw 28 thus has the effect of causing the tightening plate 26 to securely address the axle 7 of the bicycle wheel 2, and allow the left housing 20 to securely attach to the wheel 2, when the left housing 20 is coupled to right housing 50.

The left housing 20 is a hollow construct with various different structures oriented therein. To access those interior structures, preferably the top surface 22 of the left housing 20 is removable. However, removal of the top surface 22 is not required to install the left housing 20 onto the wheel 2 or to replace batteries 39 or light bulbs 43, when their replacement is required. Hence, a need for access to an interior of the left housing 20 is rarely if ever required. Within the left housing 20, a plurality of gussets 30 are oriented in a generally perpendicular orientation between the top surface 22 and the bottom surface 23. The gussets 30 add structural stability to the left housing 20 and allow the left housing 20 to have thinner walls then would otherwise be required. The gussets 30 have a plurality of wiring holes 31 passing there through to allow wiring 33 to pass between various different structures within the left housing 20.

A recharging port 32 is coupled to the wiring 33 and extends out of the left housing 20 along the curved side 24. The recharging port 32 provides a connector port which can interface with a recharger R (FIG. 6) to recharge the batteries 39 of the bicycle visibility enhancement device 10. The interior of the left housing 20 includes a negative battery terminal 34 and a positive battery terminal 35 oriented within a second battery bore 37 and a first battery bore 36, respectively. A light support region 38 is also oriented between the gussets 30 within the left housing 20, in which various different portions of the light assembly 40 are located.

The batteries 39 are oriented with one battery in the first battery bore 36 and another battery 39 in the second battery bore 37. The batteries 39 are oriented with different terminals thereof oriented within the left housing 20, so that they appropriately match the negative battery terminal 34 and positive battery terminal 35 within the second battery bore 37 and first battery bore 36. When the batteries 39 are oriented within the first battery bore 36 and the second battery bore 37 of the left housing 20, but the right housing 50 has not yet been oriented adjacent the batteries 39 and the left housing 20, the wiring 33 does not form a closed circuit. Rather, only after both the left housing 20 and right housing 50 are coupled together with the batteries 39 oriented there between, is a complete circuit of the wiring 33 provided.

The light assembly 40 is oriented within the light support region 38 of the left housing 20. The light assembly 40 includes a socket support 41 which is attached to gussets 30 within the light support region 38 of the left housing 20. A socket 42 is coupled to the socket support 41. The socket 42 includes a threaded connector which is configured to interface with a small, preferably three volt, light bulb 43. Preferably, the light bulb 43 is of the incandescent variety to provide continuous illumination. Alternatively, the light bulb 43 can be a light emitting diode (L.E.D.) or any other light source. The socket 42 is oriented such that the light bulb 43, when threaded into the socket 42, extends perpendicularly away from the curved side 24 of the left housing 20.

A reflector insert 44 is provided surrounding the light bulb 43 such that light emanating from the bulb 43 and back toward the left housing 20 is reflected out away from the left housing 20. Thus, nearly all of the light emanating from the bulb 43 is oriented primarily away from the left housing 20. A threaded cylindrical wall 45 surrounds the reflector insert 44 and the bulb 43 with threads thereof oriented inwards toward the bulb 43. The threaded cylindrical wall 45 provides an interface for attachment of the light refraction tubes 90 adjacent the left housing 20.

With further reference to FIG. 2, details of the right housing 50 are described. The right housing 50 is nearly identical to the left housing 20, with only slight modifications there between. This symmetry between the left housing 20 and the right housing 50 allows an identical or very similar mold to form both the left housing 20 and the right housing 50. The right housing 50 includes a top wall 52 and bottom wall 53 which are planar, and parallel and spaced from each other. A curved wall 54 extends between the top surface 22 and bottom surface 23 and a flat wall 55 opposite the curved wall 54 also extends between the top wall 52 and bottom wall 53.

A trough 56 analogous to the trough 26 of the left housing 20 is oriented within the flat wall 55. A tightening plate 57 similar to the tightening plate 27 is oriented within the trough 56. Similarly, a set screw 58 with spring 59 are provided adjacent the trough 56 of the right housing 50. When the left housing 20 and right housing 50 are coupled together, the set screws 28, 58 can be used to cause the tightening plates 27, 57 to sandwich the axle 7 of the bicycle wheel 2 there between, securely causing the left housing 20 and right housing 50 to attach to the bicycle wheel 2.

The right housing 50 is a hollow rigid construct with gussets 60 extending between the top wall 52 and the bottom wall 53. The gussets 60 include a plurality of wiring holes 61 through which wiring 63 of the right housing 50 can pass. A switch port 62 is oriented passing through the curved wall 54 of the right housing 50 and coupled to the wiring 63. The switch port 62 is preferably located at a location which is symmetrical with the recharging port 32 of the left housing 20. Thus, when the left housing 20 and right housing 50 are formed, it is merely required that either a recharging port 32 be oriented within the left housing 20 or that the switch port 62 be oriented within the right housing 50, thus determining whether the housing is to be configured as a left housing 20 or a right housing 50.

The right housing 50 includes a negative battery terminal 64 and a positive battery terminal 65 oriented within a first battery bore 66 and a second battery bore 67, respectively. The first battery bore 66 is substantially colinear with the first battery bore 36 of the left housing 20. Similarly, the second battery bore 67 is substantially colinear with the second battery bore 37 of the left housing 20. Thus, when the left housing 20 and right housing 50 are coupled together, the first battery bores 36, 66 are aligned together and a battery 39 can be oriented with a portion thereof within the first battery bore 36 and a portion thereof within the first battery bore 66. Similarly, a battery 39 can be oriented partially within the second battery bore 37 and partially with the second battery bore 67.

The wiring 63 does not need to couple to the wiring 33 of the left housing 20. Rather, a complete circuit is provided between the wiring 33 and the wiring 63 by having the batteries 39 oriented between the left housing 20 and the right housing 50 and interfacing with the wiring 33 and the wiring 63. Thus, the batteries 39 themselves complete a circuit within the housings 20, 50.

Alternatively, the batteries 39 can be nested completely within the separate housings 20, 50. If two batteries 39 are located in each housing 20, 50, wired in series, no electrical connection is needed between the two housings 20, 50. If an electrical connection is provided, preferably it is made weather proof using known techniques and allows the batteries 39 to be recharged simultaneously and switched on and off simultaneously. If desired, the batteries 39 can be entirely replaced using known alternate electric power sources such as bicycle wheel driven electric generators, solar power generators, and other alternative electric power sources. The right housing 50 also includes a light support region 68 therein similar to the light support region 38 and supporting a light assembly 40 therein. Preferably, two light assemblies 40 are provided for the bicycle visibility enhancement device 10, with one light assembly 40 extending from the left housing 20 and one light assembly 40 extending from the right housing 50. Alternatively, each housing 20, 50 could include multiple light assemblies 50 such that more than two light assemblies 40 would be provided.

The left housing 20 and right housing 50 are coupled together by a first bolt 70 and second bolt 71 interposed between the two housings 20, 50. The left housing 20 preferably includes threaded holes 72 oriented therein and extending into the flat side 25 of the left housing 20 between the trough 26 and a transition between the flat side 25 and opposite ends of the curved side 24. The right housing 50 preferably includes two cylindrical holes 73 in the flat wall 55 which extend perpendicularly into the flat wall 55 and are oriented such that they can align with the threaded holes 72 oriented within the left housing 20.

Preferably, the threaded holes 72 are blind bores and the cylindrical holes 73 pass entirely through the right housing 50. Thus, the first bolt 70 and second bolt 71 can pass through the cylindrical hole 73 and be threaded into the threaded hole 72 within the left housing 20. The cylindrical holes 73 are provided with a shelf with abuts with heads of the first bolt 70 and second bolt 71, to securely draw the right housing 50 toward the left housing 20. Depths of the threaded hole 72 and cylindrical hole 73 are chosen to allow the batteries 39 to be tightly secured within the first battery bores 36, 66 and the second battery bores 37, 67, such that a solid electrical connection is provided through the batteries 39.

Figure 8:
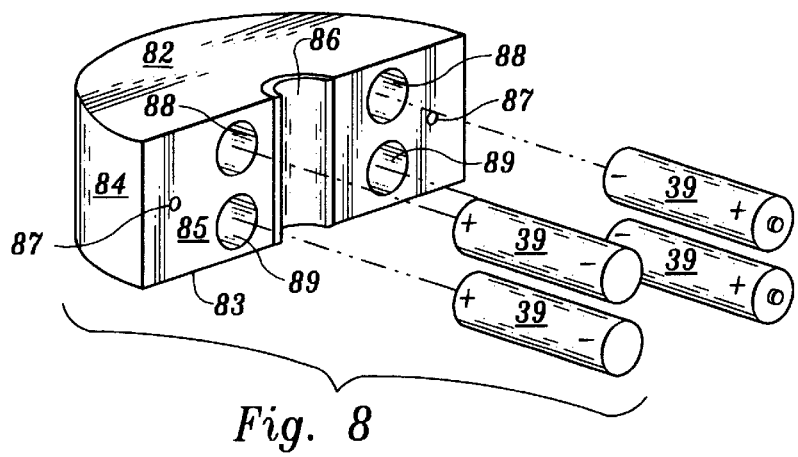
FIG. 8 is a perspective view of an alternative embodiment of that which is shown in FIG. 7, revealing how a four battery version of the device of this invention would be configured.

As an alternative to the left housing 20 and right housing 50 described above, a double thick housing 80 can be provided (see FIGS. 7 and 8). Such a double thick housing 80 includes a planar top surface 82 parallel to and spaced from a planar bottom surface 83. A curved side 84 extends between the top surface 82 and bottom surface 83 and a flat side 85 extends between the top surface 82 and bottom surface 83. A trough 86 is oriented within the flat side 35 along with bolt holes 87. The flat side 35 includes two top battery bores 88 adjacent the top surface 82 and two bottom battery bores 89 adjacent the bottom surface 83.

The double thick housing 80 is similar to the left housing 20 except that two batteries are provided in parallel forming part of the circuit. Note that because the two batteries 39 are oriented in parallel with each other, a total voltage of the circuit is not altered. Rather, only an amount of current which can be supplied for the bicycle visibility enhancement device 10 can be magnified. The double thick housing 80 is advantageous when the axle 7 of the wheel 2 is sufficiently wide to accommodate such a double thick housing 80 and it is desirable that recharging of the batteries 39 occur less frequently than would otherwise be the case.

With reference to FIGS. 2 and 4, details of the light refraction tube 90 are provided. The light refraction tube 90 is provided to maximize the illumination which is provided from the bulb 43 of the light assembly 40. Each light assembly 40 includes a light refraction tube 90 extending there from. The light refraction tube 90 is primarily a hollow conical construct of translucent material. The light refraction tube 90 includes a base 92 which is cylindrical and has threads 95 on an outer surface 94 thereof. The threads 95 are sized to mesh with the threads of the threaded cylindrical wall 45 of each light assembly 40. Thus, the threads 95 secure the base 92 of the light refraction tube 90 in position overlying each light assembly 40.

The light refraction tube includes a conical surface 96 which surrounds an interior 97 of the light refraction tube 90. The conical surface 96 preferably tapers only very gradually from the base 92 to a tip 100. The tip 100 includes a concave surface 102 which is wider than portions of the conical surface 96 of the light refraction tube 90 adjacent the tip 100. A flat surface 104 extends from edges of the concave surface 102 to the conical surface 96, thus closing the tip 100 of the light refraction tube 90. The concave surface 102 is preferably reflective, causing light impacting the concave surface 102 to be redirected away from the concave surface 102 and the tip 100.

Adjacent the light assembly 40 and within the light refraction tube 90, the reflector 44 is oriented to direct as much as the light emanating from the bulb 43 as possible. The reflector 44 includes a cylindrical support 106 (FIG. 5) which surrounds the socket 42 and an outer circumference 107 and inner circumference 108 which define a generally parabolic portion of the reflector 44. The bulb 43 is preferably oriented as close to a focus of the parabola formed by the reflector 44, between the inner surface 108 and outer surface 107, as possible. Thus, light emanating from the bulb 43 in a direction generally back toward the housing 20, 50 impacts the parabolic surface of the reflector 44 between the inner circumference 108 and the outer circumference 107 and is then generally directed perpendicularly away from the housing 20, 50 and toward the tip 100 within the interior 97 of the light refraction tube 90.

With particular reference to FIG. 4, details of refraction of light L within the light refraction tube 90 is described. The conical surface 96 of the light refraction tube 90 is formed of a material which is translucent. Stated alternatively, the material forming the conical surface 96 is only partially opaque, so that when light rays L impact the conical surface 96, they cause the portion of the conical surface 96 which has been impacted by the light L to be illuminated somewhat by having the light L pass through the conical wall 96, and then radiate in a variety of different directions from the conical surface 96. Hence, light L from the bulb 43 eventually impacts the conical surface 96 and then radiates in a random direction from the conical surface 96 so that the entire light refraction tube 90 is illuminated by the bulb 43 located therein. Preferably, the material forming the tube 90 is colored (such as red or green) so that light emitted from the tube 90 is more distinct to viewers of the device 10.

The orientation of the light refraction tube 90 extending radially from the hub 7 to the rim 4 at two positions on each wheel 2 provides full diameter illumination of the wheel 2 when the bicycle is viewed from the side. On a standard bicycle with 26 inch rims, two visibility enhancement devices 10 can provide 52 inches of illumination for the bicycle, illuminating over two-thirds of the length of the bicycle.

Because the light refraction tube 90 is rather long, especially on large diameter wheels 2, the light refraction tube 90 tapers along the conical surface 96 so that the light refraction tube 90 is narrower adjacent the tip 100 than it is adjacent the base 92. This conical surface 96 is thus more illuminated than would otherwise be the case if it were cylindrical, especially near the tip 100 of the light refraction tube 90. Thus, an amount of illumination of the light refraction tube 90 is relatively constant along an entire length of the conical surface 96 of the light refraction tube 90. Light from the bulb 43 which extends all of the way down the light refraction tube 90 and impacts the concave surface 102 of the tip 100 is reflected by the concave surface 102 and then is scattered in a variety of different directions through translucent sides of the tip 100 portion of the light refraction tube 90. Thus, a relatively bright tip 102 of the light refraction tube 90 is provided to enhance the visibility augmentation which is provided by the bicycle visibility enhancement device 10.

Figure 9:
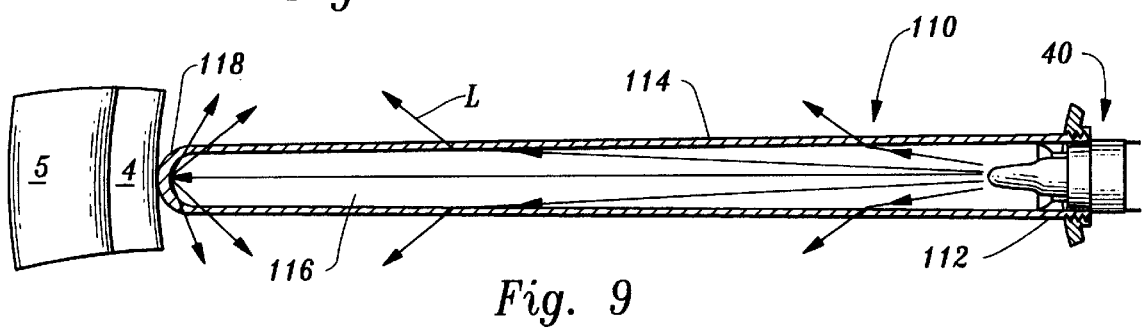
FIG. 9 is a front elevation view of a cylindrical tube which provides an alternative embodiment to the light refraction tube of the preferred embodiment.
Figure 10:
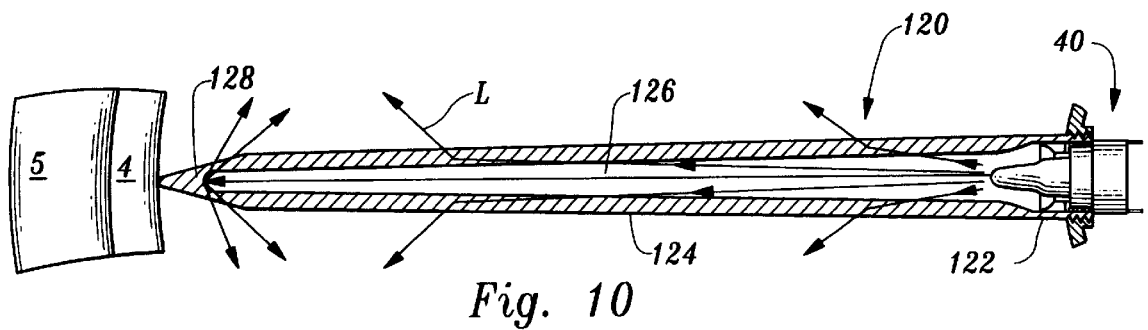
FIG. 10 is another alternative embodiment of that which is shown in FIGS. 4 and 9, revealing a sword tube which replaces the light refraction tube of the preferred embodiment.

While the light refraction tube 90 is preferred, an alternative embodiment of the light refraction tube 90 is a cylindrical tube 110 (see FIG. 9). The cylindrical tube 110 is particularly advantageous for small diameter bicycle wheels. The cylindrical tube 110 includes a base 112 similar to the base 92, a cylindrical surface 114 generally analogous to the conical surface 96, an interior 116 and a tip 118 opposite the base 112. The tip 118 is preferably reflective to cause light which reaches the tip 118 to be reflected back within the interior 116 until it impacts the cylindrical surface 114 and then radiates outward therefrom. The cylindrical tube 110 has the advantage that it is a simpler structure to manufacture than the conical surface 96 of the light refraction tube 90.

Another alternative to the light refraction tube 90 is a sword tube 120. The sword tube 120 is preferably shaped somewhat as a small flat-surfaced sword, with a hollow interior 126 and a blade surface 124 following both sides of the interior 126. The sword tube 120 also includes a base 122 and tip 128 analogous to the base 112 and tip 118 of the cylindrical tube 110. The sword tube 120 benefits from additional illumination provided to the blade surface 124 on opposite sides of the interior 126. Also, the sword tube 120 has an appearance which would be generally attractive to many children, enhancing the likelihood that the children would want to have the bicycle visibility enhancement device 10 installed upon their bicycle.

Preferably, the interior 126 within the sword tube 120 is conical, such that the benefits provided by the light refraction tube 90 over the cylindrical tube 110 can be enjoyed. Alternatively, the sword tube 120 can include a cylindrical interior. The sword tube 110 can also include various different variations in wall thickness of the blade surface 124, such that when the sword tube 120 is illuminated by light emanating from the bulb 43, a visually attractive pattern is provided.

With reference to FIG. 6, details of the circuit formed by the wiring 33, 63 is provided. The circuit which powers the bicycle visibility enhancement device 10 is a simple series circuit. Two batteries 39 are provided in series with two bulbs 43 which are coupled to the wiring 33 through a socket 42. Also in series with this circuit is the switch port 62, which can interrupt operation of the bicycle visibility enhancement device 10. When the switch port 62 is toggled so that the circuit is deactivated, the recharger R can be oriented into the circuit, so that it can provide power into the circuit to recharge the batteries 39.

While the circuit shown in FIG. 6 is the preferred circuit for this invention, it would also be possible for the batteries 39 to be oriented in a variety of different manners, and for the recharger and switch to also be oriented in a variety of different arrangements. One advantage of this circuit is that half of the circuit can be oriented within the left housing 20 and the other half can be oriented within the right housing 50 with the only connection between the two housings 20, 50 being the batteries 39 themselves. Thus, no electrical connections are exposed to environmental conditions, and a reliability and corrosion resistance aspect of the invention is enhanced.

Moreover, having thus described the invention it should now be apparent that various different modifications can be made to the preferred embodiment without departing from the scope and fair meaning of this disclosure. For instance, various different light refraction tubes could be provided which would refract light in a variety of different directions that would be both appealing and highly visible. Also, it is conceivable that the circuit arrangement and battery arrangement could be altered to provide for a greater number of batteries or to simplify manufacture of the housings 20, 50. Furthermore, while it is anticipated that most of the components of the bicycle visibility enhancement device 10 could be formed by injection molding from plastic, various different materials could satisfactorily be utilized to form the individual components of the bicycle visibility enhancement device 10.

What is claimed is:

1. A visibility enhancement safety device for attachment to a wheel of a vehicle, such as a bicycle, wheel chair, baby carrier, motorcycle or any vehicle with a wheel and hub, to enhance the ease with which others can see the vehicle in darkness, comprising in combination:

a source of electric power;

an electrically powered light emitting source, said light source coupled to said power source;

a means to attach and rigidly secure said power source and said light source to a hub of a wheel, the hub rotatably supported to a vehicle at a rotational axis of the wheel;

wherein said light source emits light continuously when said light is rotating;

an elongate light tube overlying said light source and extending from said light source toward a rim of the wheel, said elongate light tube formed of a translucent material; and wherein said light tube is substantially rigid.

2. The visibility enhancement device of claim 1 wherein said visibility enhancement device includes at least two lights sources, each said light source located a substantially equal distance from the rotational axis of the wheel of the vehicle to which said light sources are attached.

3. The visibility enhancement device of claim 1 wherein said light source includes at least one incandescent light bulb extending radially from the rotational axis of the wheel, said light bulb coupled to said source of electric power, and wherein said visibility enhancement device includes a reflector radially spaced from said light bulb and oriented to reflect light from said light bulb back toward said light bulb.

4. The visibility enhancement device of claim 1 wherein said attachment means includes two housings and a means to secure said two housings together with the hub of the wheel between said two housings, each said housing supporting at least one said light source extending therefrom.

5. The visibility enhancement device of claim 4 wherein said two housings exhibit a similar external contour.

6. The visibility enhancement device of claim 4 wherein said two housings are each semi-cylindrical in contour including a curved side facing radially away from the hub of the wheel when said housings are attached to the hub of the wheel, at least one of said light sources located adjacent said curved side.

7. The visibility enhancement device of claim 1 wherein an elongate tube of translucent material covers said light source, said elongate tube having a long axis extending substantially linearly away from the hub of the wheel.

8. The visibility enhancement device of claim 7 wherein said elongate tube includes a hollow interior which is tapered to have a greater diameter adjacent said light source than a diameter on portions of said elongate tube spaced from said light source.

9. The visibility enhancement device of claim 8 wherein said elongate tube includes a tip opposite said light source, said tip having a surface facing said light source which is reflective, such that light impacting said tip from said light source is reflected back through said interior of said elongate tube.

10. The visibility enhancement device of claim 7 wherein said elongate tube extends from the hub of the wheel to a rim of the wheel.

11. The visibility enhancement device of claim 7 wherein said elongate tube has a contour with a faceted outer surface similar to that of a sword, with a point adjacent a tip opposite said light source.

12. A bicycle featuring illumination on wheels thereof, comprising in combination:
   at least two wheels;
   each said wheel including a hub rotatably supported by said bicycle at a central rotational axis of each said wheel;
   at least one of said hubs having spokes extending radially from said hub to a circular rim centered around said hub;
   a light source fixed to said hub of at least one of said wheels;
   an elongate light tube overlying said light source and extending from said light source toward said rim, said elongate light tube formed of a translucent material;
   said light source and said light tube oriented to shine light both forward and backward when said wheel to which said light source is fixed is stationary; and
   said light tube extending substantially linearly away from said hub to a tip.

13. The bicycle of claim 12 wherein said elongate light tube is hollow with an interior of said tube positioned with said light source located therein.

14. The bicycle of claim 13 wherein said tube has conical side walls extending from a circular base to a tip opposite said circular base, said circular base fixed to said hub and surrounding said light source.

15. The bicycle of claim 12 wherein said elongate light tube of said translucent material includes means to emit light from an outer surface thereof when light from said light source impacts an inner surface of a hollow interior of said elongate light tube, such that said elongate light tube emits light from said outer surface.

16. The bicycle of claim 12 wherein a reflective surface surrounds said light source on a side of said light source opposite said elongate light tube, said reflective surface including means to reflect light emanating from said light source and away from said elongate light tube back towards said elongate light tube, such that a majority of light emanating from said light source is directed toward said elongate light tube.

17. A kit for attachment to a bicycle wheel to enhance visibility of the bicycle in low ambient light conditions, the wheel having a hub located at a center of the wheel and rotatably supported by the bicycle, the wheel having spokes extending substantially radially from the hub to a rim, the kit comprising in combination:
   a light source;
   means to attach said light source to the hub of the wheel in a manner fixing said light source relative to the wheel;
   said attachment means positioning said light source adjacent the hub with light from said light source radiating away from said hub;
   said attachment means being substantially radially symmetrical about the hub, such that dynamic and static balance of the wheel is not significantly altered by said attachment means;
   an elongate light tube overlying said light source and extending from said light source toward a rim of the wheel, said elongate light tube formed of a translucent material; and
   wherein said light source emits light continuously when said light is rotating.

18. The kit of claim 17 wherein said light source is an incandescent light bulb coupled to an electric power supply attached to the hub, said incandescent light bulb configured to emit light continuously.

19. The kit of claim 17 wherein an elongate light tube having a hollow interior is oriented adjacent said light source, said light tube fixed in position extending radially away from said hub and toward said rim, said tube having a wall which is at least partially transparent to light from said light source, said walls including means to diffuse the light from said light source.

20. The kit of claim 19 wherein said tube has a length similar to a distance from said hub to said rim, said hollow interior of said tube tapering from a greater width adjacent said light source to a lesser width adjacent a tip of said tube, said tip opposite said hub and adjacent said rim.

* * * * *